United States Patent [19]
Jordan

[11] 3,801,092

[45] Apr. 2, 1974

[54] VACUUM HOLDDOWN DEVICE FOR MOVING BELTS

[75] Inventor: William E. Jordan, Penfield, N.Y.

[73] Assignee: Xerox Corporation, Stamford, Conn.

[22] Filed: Oct. 20, 1972

[21] Appl. No.: 299,572

Related U.S. Application Data

[62] Division of Ser. No. 102,312, Dec. 29, 1970.

[52] U.S. Cl. ............................................. 271/197
[51] Int. Cl. ............................................. B65h 5/22
[58] Field of Search............ 271/74, 197; 294/64 R, 294/65

[56] References Cited
UNITED STATES PATENTS

| | | | |
|---|---|---|---|
| 3,285,112 | 11/1966 | Dale et al. ........................ 271/74 X |
| 3,307,869 | 3/1967 | Warfel .............................. 294/64 R |
| 2,895,552 | 7/1959 | Pomper et al. ................... 271/74 X |

Primary Examiner—Evon C. Blunk
Assistant Examiner—James W. Miller

[57] ABSTRACT

A vacuum holddown device for use in an apparatus employing flexible web material in a flattened condition. A perforated plenum plate is joined to a manifold connectable to a vacuum producing means. A plurality of ribs are formed on the plate between it and the manifold. When the space between the plenum plate and manifold is evacuated the latter is forced against the ribs.

3 Claims, 8 Drawing Figures

VACUUM HOLDDOWN DEVICE FOR MOVING BELTS

This is a division of application Ser. No. 102,312, filed 12/29/70.

This invention relates to belt assemblies and particularly, to improvements in a vacuum holddown device for an endless photoreceptor belt. The vacuum holddown device arranged in accordance with the present invention is particularly adapted for use with selenium belts in automatic copiers reproducing machines that are constructed for high speed operation and require runs of the belt that are flat for specific processing action.

In order to overcome many disadvantages for high speed copying, the latest machine concept for copiers utilizes flash exposure of a document and the arrangement of a moving photoconductor material in the form of an endless belt held in a flat non-wavering condition at the instant of exposure. The use of belt tension devices, such as rollers, which are forced against the belt to place the same in tension in attempts to form planar sections of the belt have not proven feasible in actual practice for good image resolution. These attempts have not prevented belt runs from vibrating during imaging and have not placed the runs in acceptable flattened condition. In addition, there is the prevalent damages that the forces used to produce the tension will also cause damage to the belt.

It is, therefore, the principal object of this invention to improve copiers/reproduction machines of the type having a belt form of photoreceptor by maintaining the belt run in the exposure station in a flat condition that is dependable, fixed and accurate for all exposures.

Another object of this invention is to improve means for holding belt runs in a flat condition for use in the developing and cleaning stations wherein a backing support is necessary as well as the flat portion.

These and other objects of this invention are obtained by means of a perforated plenum plate upon which a belt run is applied and a manifold attached to the other side of the plate to form a space therebetween. Between the manifold and the plate there are positioned ribs one of which completely encircles the others end upon which the manifold is forced when the space is evacuated.

For a better understanding of the invention as well as other objects and further features thereof, reference is had to the following detailed description of the invention to be read in conjunction with the accompanying drawings wherein.

Figure 1:
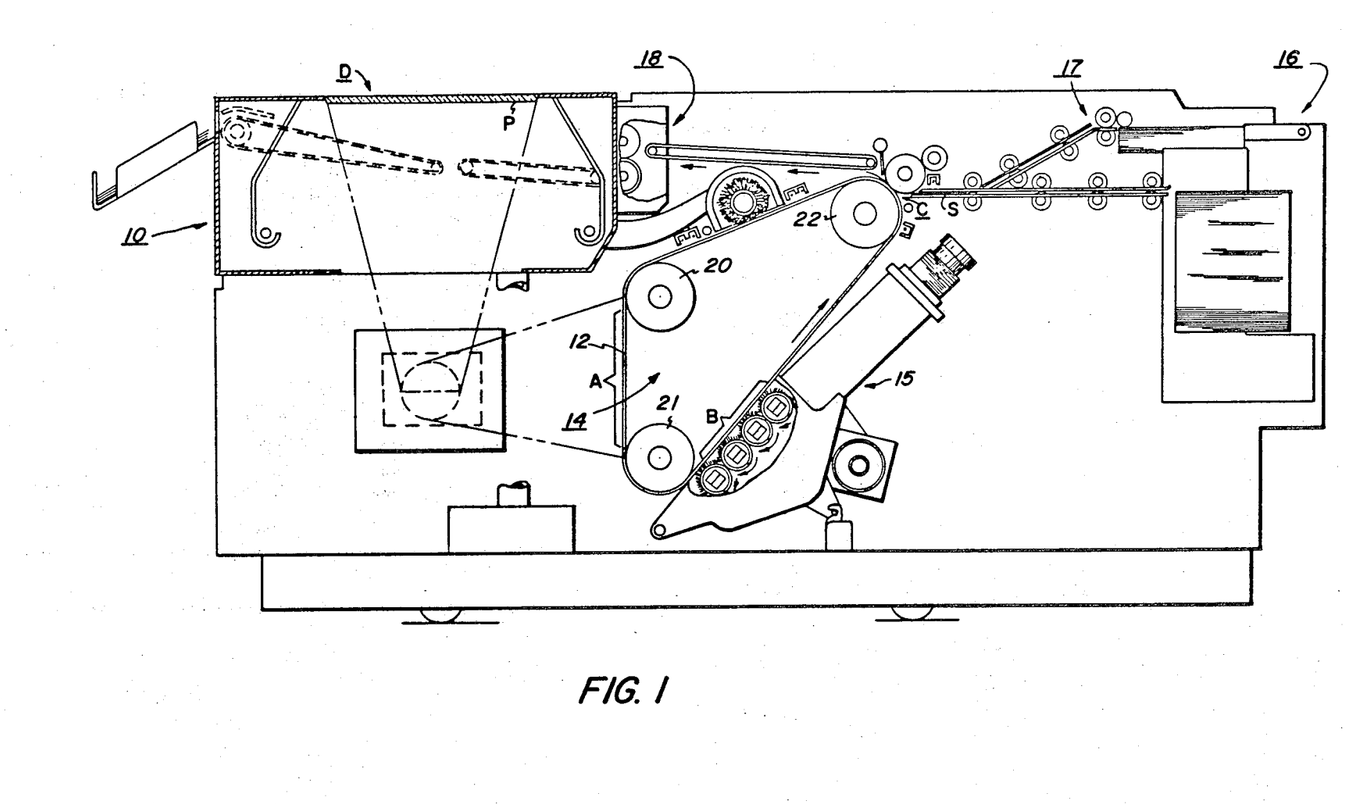
FIG. 1 is a schematic sectional view of an electrostatic reproduction machine showing the various processing stations.

For a general understanding of the illustrated copier/reproduction machine, in which the invention may be incorporated, reference is had to FIG. 1 in which the various system components for the machine are schematically illustrated. As in all electrostatic systems such as a xerographic machine of the type illustrated, a light image of a document to be reproduced is projected onto the sensitized surface of a xerographic plate to form an electrostatic latent image thereon. Thereafter, the latent image is developed with an oppositely charged developing material to form a xerographic powder image, corresponding to the latent image on the plate surface. The powder image is then electrostatically transferred to a support surface to which it may be fused by a fusing device whereby the powder image is caused permanently to adhere to the support surface.

In the illustrated machine, an original to be copied is placed upon a transparent support platen P fixedly arranged in an illumination assembly generally indicated by the reference numeral 10, arranged at the left end of the machine. While upon the platen, an illumination system flashes light rays upon the original thereby producing image rays corresponding to the informational areas on the original. The image rays are projected by means of an optical system for exposing the photosensitive surface of a xerographic plate in the form of a flexible photoconductive belt 12 arranged on a belt assembly generally indicated by the reference numeral 14.

As will be described below, the photoconductive belt assembly 14 is slidably mounted upon two support shafts one of which is secured to the frame of the machine and is adapted to drive a belt 12 in the direction of the arrow at a constant rate. During this movement of the belt, the reflected light image of an original on the platen is flashed upon the xerographic surface of the belt to produce electrostatic latent images thereon at an exposure station A.

As the belt surface continues its movement, the electrostatic image passes through a developing station B in which there is positioned a developer assembly generally indicated by the reference numeral 15 and where the belt is maintained in a flat condition. The developer assembly 15 provides development of the electrostatic image by means of multiple magnetic brushes as the same moves through the development zone B.

The developed electrostatic image is transported by the belt to a transfer station C whereat a sheet of copy paper is moved between a transfer roller and the belt at a speed in synchronism with the moving belt in order to accomplish transfer of the developed image solely by the electrical bias on the transfer roller. There is provided at this station a sheet transport mechanism generally indicated at 16 adapted to transport sheets of paper from a paper handling mechanism generally indicated by the reference numeral 17 to the developed image on the belt at the station B.

After the sheet is stripped from the belt 12, it is conveyed into a fuser assembly generally indicated by the reference numeral 18 wherein the developed and transferred xerographic powder image on the sheet material is permanently affixed thereto. After fusing, the finished copy is discharged from the apparatus at a suitable point for collection externally of the apparatus.

Drive means is arranged to drive the selenium belt 12 in conjunction with timed flash exposure of an original to be copied, to effect image development, to separate and feed sheets of paper and to transport the same across the transfer station C and to convey the sheet of paper through the fuser assembly in timed sequence to produce copies of the original.

Figure 4:
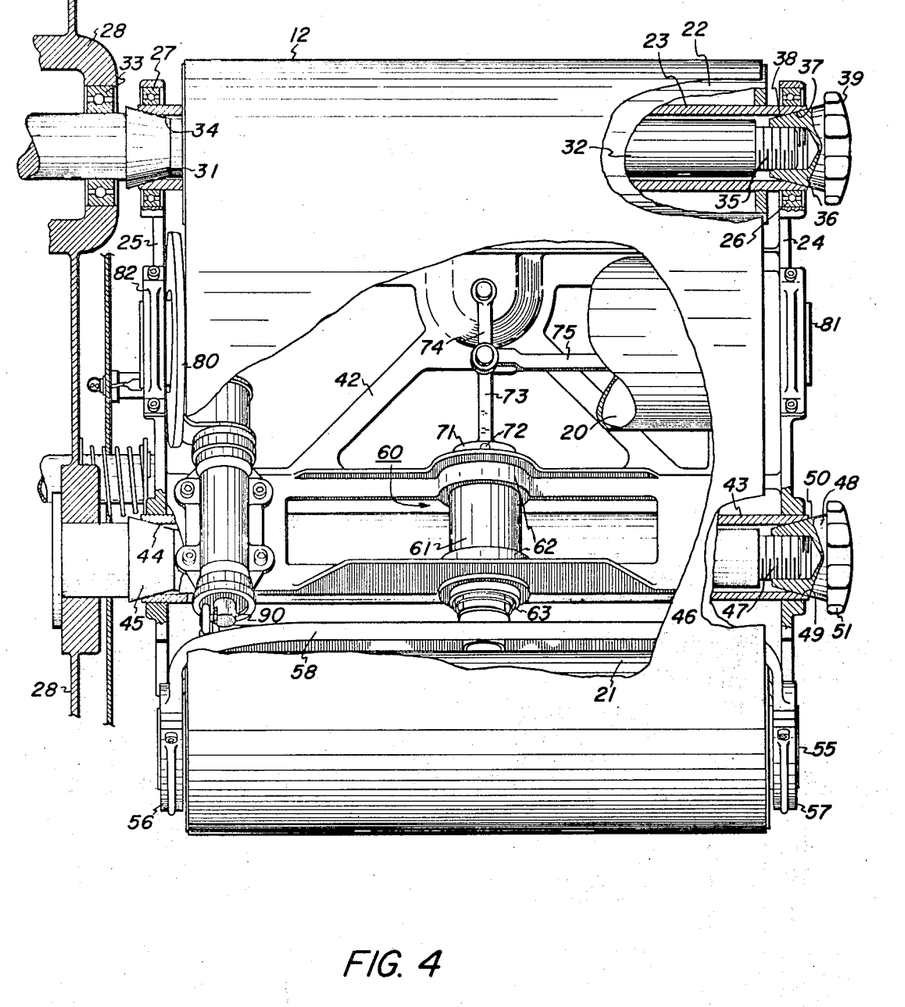
FIG. 4 is a partial sectional view of the belt assembly from the side of the machine with the belt mounted thereon partly in section to show various internal parts.

The belt 12 comprises a photoconductive layer of selenium which is the light receiving surface and imaging medium for the apparatus, on a conductive backing. The belt is journaled for continuous movement upon three rollers 20, 21 and 22 located with parallel axes at approximately the apex of a triangle. During exposure of the belt 12, the portion thereof being exposed is that part of the belt run between the roller 20 and the lower roller 21. As shown in FIG. 4, the photoconductive belt assembly 14 is illustrated with the photoreceptor belt 12 partially broken away removed in order to illustrate the assembly mechanisms located adjacent the belt.

The upper roller 22 is rotatably supported on a hollow shaft 23 journaled in two side plates 24 and 25, each having the general configuration of a triangle. The upper apex of the side plate 24 is formed with an opening for containing and supporting a bearing 26 which rotatably supports one end of the shaft 23. At the other end, the shaft 23 is journaled in a bearing 27 supported at the upper apex for the side plate 25 in the same manner. Positioned within and along the hollow shaft 23 and projecting through a machine support frame plate 28 there is a drive shaft 30 formed with a conical element 31 and a reduced diameter extension 32. The drive shaft is supported on the frame by a bearing 33 mounted in the frame and is connected to a drive mechanism (not shown). The conical element 31 is axially fixed and extends outwardly from the frame 28 so as to be mated with an inwardly tapered or chamfered end 34 of the hollow shaft 23 when the belt assembly is mounted on the frame. At the other end of the hollow shaft 23, the drive shaft 30 terminates in a threaded shank 35 which cooperates with a locking member 36 formed with a conical portion 37 adapted to mate with an inwardly chamfered surface 38 of the outer end of the hollow shaft 23. The locking member is also formed with a rotary hand-operated knob 39 for facilitating easy removal of the member for purposes to be described below.

The purpose for the extended drive shaft 32 is to aid in supporting, as will be described below, and for rotating the roller 22 and, consequently the belt, when the belt assembly 14 is in operating position; that is, when the side plate 25 is positioned against the main frame plate 28. This arrangement also permits the easy removal of the belt assembly 14 from the machine frame.

The side plates 24 and 25 are maintained in parallel planes and rigidly supported in spaced relation for supporting the rollers 20, 21 and 22 and all of the other structures that comprise the belt assembly 14 by internal structural plates 42 and also by the hollow shaft 23 by virtue of the ends of this shaft being fixed to the inner races of the bearings 26, 27. The plates 24 and 25 are also spaced and held in position by a hollow shaft 43 which is identical to the rotatable hollow shaft 23 except that its ends are secured to the side plates, and does not rotate. At the end adjacent the frame plate 28, the shaft 43 is chamfered at 44 and arranged for cooperation with the conical portion 45 of a support shaft 46 positioned axially in the hollow shaft 43. The shaft 46 is secured to the frame 28 and has its outer end formed as a threaded position 47 which cooperates with a locking member 48. This member is identical to the locking member 36 and is provided with an inwardly tapering or conical portion 49 which is cooperable with an inwardly chamfered surface 50 formed at the outer end of the hollow shaft 43. A knob 51 on the member 48 allows manual locking of the inner shaft 46 relative to and within the hollow shaft 43. From the foregoing, it will be understood that the belt assembly 14 is mounted in cantilever fashion on the frame support plate 28 by means of the hollow shafts 23 and 43, and that by virtue of the use of tapered or conical portions 31, 37 in the case of the shaft 23 and the conical portions 45, 49 in the case of the shaft 43, the belt assembly is adapted to be accurately positioned in its required location after movement of the assembly from the frame 28. It will be appreciated that this structure allows quick and easy removal and replacement of the belt assembly upon the frame while still providing means for driving the belt and permit removal of the belt 12 from its supporting assembly.

The belt assembly 14 is provided with an arrangement for tracking the belt 12 in the event it deviates laterally in either direction during its movement around the rollers 20, 21, 22. The arrangement includes the mounting of the roller 21 for rocking movement and an edge guiding device associated with the roller 20 for producing the rocking movement of the roller 21 in response to lateral deviation of the belt.

Figure 2:
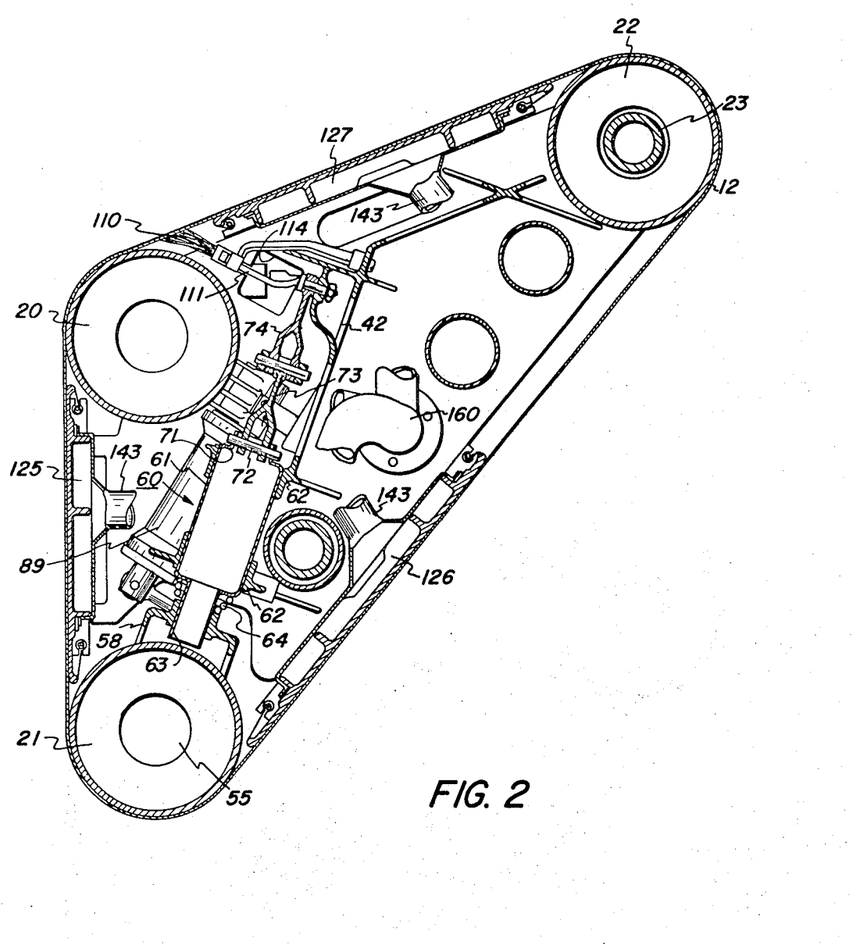
FIG. 2 is a partial cross-sectional view of a belt assembly as seen from the front of the machine.

As shown in FIGS. 2 and 4, the roller 21 is secured to a shaft 55 journaled in bearings secured to the ends of the parallel legs 56, 57 of a yoke member 58. At the mid-point of the yoke member and extending in an opposite direction relative to the legs 56, 57, there is mounted a shaft 60 which serves to support the yoke member for limited rocking movement about the axis of this shaft and to permit slight retraction. The shaft 60 is preferably in the form of a cylinder 61 of relatively large diameter and being rotatably mounted in spaced bearings 62 mounted on the frame 42 and having a coaxial reduced portion 63 secured to the lower cylinder 61 and secured within a suitable opening formed in the bight portion of the yoke member 58. A relatively heavy coil spring 64 encircles the portion 63 between the yoke member and the lower surface of the lower bearing 62. Rocking movement of the yoke member 58 about the axis of the cylinder shaft 60 will impart rotation of the cylinder 61 within the bearings 62. The spring 64 imparts a continous outward force upon the yoke and consequently the roller 21, when the belt 12 is mounted on its supporting rollers thereby placing the belt under slight tension during operation. The structural connection between the yoke member and the portion 63 is slightly loose in order to allow very limited play between these parts to correct for slight edge to edge circumferential variations in the belt 12.

Means are provided for retracting the roller 21 inwardly of the belt assembly to permit the easy removal and mounting of a belt upon the assembly. To this end, the inner end of the cylinder 61 is connected to a quick-acting toggle arrangement which will draw the cylinder inwardly so as to carry the roller 21 therewith to a retracted position. The toggle arrangement also serves to retain the yoke member 58 and roller 21 in the belt assembly.

The upper part of the cylinder shaft 61 is formed with a tubular extension 71 axially aligned therewith. Suitable openings are formed in the sleeve in diametrically opposed positions for supporting a pin 72 which pivotally connects one end of a link 73 to this end of the cylinder 61. The link 73 is pivotally connected at its other end to one end of another link 74 having its opposite end pivotally connected to the frame structure 42. It will be apparent that the links 73, 74 and their respective connections form a toggle device which when actuated into alignment will cause the cylinder 61 to move outwardly and when actuated into a buckled condition will cause the cylinder to be retracted inwardly. These actuations of the toggle links are produced by a drive link 75 which is pivotally connected at one end to the pivot connection between the links 73, 74 and extends transverse of the belt assembly, through the outer wall 24 therefor and ending in a pivotal handle 76 for actuating the link 75 axially for causing actuation of the toggle 73, 74 in either of its two operating conditions. In order to remove or to replace a belt 12, the handle 76 is suitably manipulated to cause buckling of the toggle links 73, 74, which action draws the cylinder 61 inwardly to retract the roller 21. This forms sufficient slack in the belt as to permit an operator to move a belt easily relative to the rollers 20, 21 and 22. After a belt is placed on these rollers for machine operation, the handle 76 is manipulated in the opposite direction in order to place the links 73, 74 in their aligned condition, as shown in FIG. 4, for forcing the roller 21 against the belt 12 and locking the roller in this position. In this operation, the spring 64 serves as an overdrive and, as previously mentioned, as a tensioning means for the belt. There is another overdrive function for this spring, as will be described below.

As shown in FIGS. 2 and 4, the axis of the shaft 60 (cylinder 61 and the portion 63) is perpendicular to the axis of the roller 21 and in the same plane therewith. This plane, also substantially bisects the angle between the planes of the belt runs between the roller 21 and each of the rollers 20 and 22. In the event the belt 12 starts to skew, in other words, to deviate from its predetermined set position with respect to all of its guide rollers, the resultant lateral movement of the belt will be sensed by a sensing arrangement to be described below, and this will result in positive action being utilized to skew or rock the roller 21 about the axis of the shaft 60 for returning the belt back to its original predetermined working position. This control skew is a tracking action and will effect an angular relationship of the roller 21 relative to the direction of movement of the belt thereby causing the same to steer or follow the roller surface and be displaced laterally in order to return the belt back to a centered position rather than exerting pressure on the belt adjacent one edge portion thereof. In this manner, pressure is applied equally to all portions of the belt affected during tracking action thereby minimizinng the tendency of the tracking arrangement to adversely affect belt structure by exerting undue pressures of the belt structure adjacent one edge or the portion between the mid-line of the belt and one edge. With the axis of pivoting of the roller 21 lying on the bisecting plane for the planes of the photoreceptor belt runs, the deflection of the ends of the roller occurs in opposite direction to provide maximum belt correction with minimum roller skewing. Preferably the roller 21 is covered with rubber coating which will prevent slippage of the belt as it steers during tracking. During rocking of the shaft 55, both edges of the belt are affected equally and, as the skewing increases during tracking action, any tendencey of the belt to lessen in circumference will cause movement of the roller 21 inwardly against the tension of the spring 63 which serves as an overdrive or a shock absorber for tracking action.

In the event that the belt 12 is removed and a new one applied to the belt assembly which has a slightly larger or smaller circumference, the spring 63 will always maintain the same pressure of the roller 21 upon the belt thereby insuring the same tension upon a belt regardless of its circumferential size. The arrangement also eliminates any two directional forces being applied to the belt which could have a destructive effect upon the relatively thin film of the photoconductive material on the belt. In addition, with the axis of the roller 21, lying on the bisecting plane of the angle between the adjacent belt runs during rocking movement of this roller, there is a minimum of deflection, caused by skewing of the belt, along the exposure belt run between the rollers 20, 21 thereby minimizing the effect of belt skewing upon the imaging abilities on this run during an exposure of an original.

Sensing means are provided in the belt assembly 14 in order to initiate controlled instantaneous rocking of the shaft 55 for the roller 21 in either direction depending upon the direction of slipping of the belt axially relative to the shafts of the rollers 20, 21, 22. Deviation of the belt is initially detected by a flat ring 80 encircling one end of the shaft 81 which supports the roller 20 for rotation in the belt assembly. The shaft 81 is preferably hollow and is rotatably mounted at each end in bearings 82 mounted in the end walls 24, 25. The ring 80 is preferably made of wear-resistant plastic material which will not become damaged when in contact with the relatively sharp edge of the belt 12, and yet will not cause fraying or other damage to the co-acting edge of the belt. The ring 80 is mounted for rotation, which occurs during contact with the belt, in order to minimize wear of the ring. Rotation is accomplished by means of a ball bearing device comprising an inner race 83 to which the ring 80 is axially aligned and secured and an outer race 84 which is secured to a circular plate 85 on a sensing support structure for the ring 80. For ease of use, the plate 85 is formed with a central opening 86 which allows the assembled structure comprising the ring 80, the races 83, 84 and the plate 85 to accommodate and avoid the adjacent end of the shaft 81 and allow the ring 80 to engage the edge of the belt 12.

The support plate 85 is secured to curved arm 87 which in turn is integral with the upper end of an angularly inclined shaft 88 mounted for rotation along its longitudinal axis within a fixed cylindrical casting 89. Spaced brackets 90 integral with the casting 89 are mounted by screws to the frame structure 42 for the belt assembly. Suitable bearings (not shown) are utilized within the casting between the same and the shaft 88 in order to facilitate the rotating relationship between these elements. At the lower end of the shaft 88, there is formed a reduced portion 91 which is rotatable with the shaft and to which is attached an element 92 extending perpendicular relative to the axis of the shaft so to swing in either direction upon corresponding rotative movement of the shaft. The element 92 is pivotally connected to a link member 93 which in turn is connected to an ear 94 formed at one end of the yoke member 58. It will be apparent from the foregoing description that the roller 21 is adapted for rocking movement in at least one direction when the sensing ring 80 is moved outwardly, or in that direction away from the adjacent end of the roller 20. Upon this motion of the sensing ring, the shaft 88 is rotated about its axis due to its connection to the ring by way of the arm 87. The corresponding rotation of the shaft 88 will impart a swinging movement to the element 92 to cause movement of the link 93, and consequently the rocking of yoke member 58 for producing the same motion on the tracking roller 21. This final action on the roller, which is relatively slight, will effect movement of the belt away from the ends of the rollers 20, 21 and 22 which are adjacent the side of the belt assembly to which the sensing ring 80 is positioned. In the event the ring 80 is moved toward the adjacent end of the roller 20, the roller 21 will be rocked in a direction that causes the belt to track toward the above referred to ends of the rollers.

Figure 3:
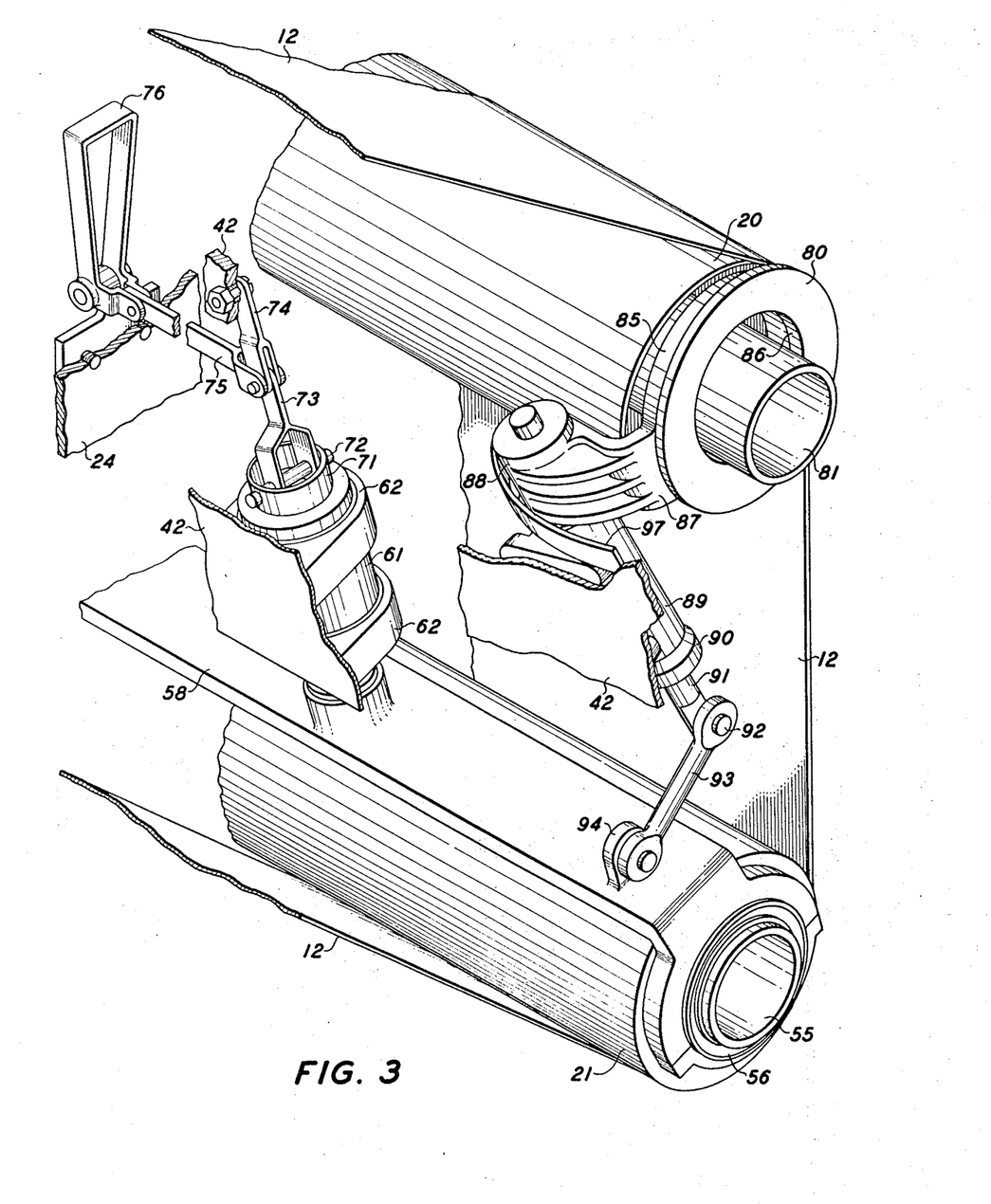
FIG. 3 is an isometric view of a portion of the belt assembly as seen from the front of the machine.

Movement of the sensing ring 80 in either direction in order to produce rocking of the tracking roller 21 in either direction and thereby cause tracking of the belt 12 in a direction which is opposite that in which the sensing ring moves occurs when the edge of the belt 12 deviates from a predetermined position relative to the guide rollers which support. For accurate alignment and positioning of electrostatic latent images and then corresponding developed images with resepct to the processing stations of the printing machine, it is necessary that the photoreceptor belt maintain a constant and predictable path of movement. In the event the belt deviates from a prescribed path of movement, say in the direction inwardly of the frame structure 28, the edge of the belt will engage the surface of the sensing ring 80 and cause corresponding movement of the ring toward the frame structure, or toward the right as viewed in FIG. 3. The amount and rate of this movement of the ring is consonant with the amount and rate of deviation of the belt. As described above, with the sensing ring being moved in this manner, the tracking roller 21 will be rocked in order to cause a counter tracking of the belt so as to restore the belt to its original predetermined path of movement. Deviation of the belt in the other direction, that is, away from the frame 28, the sensing ring will follow the away - moving edge of the belt in order to produce rocking of the tracking roller in a direction which will stop the deviation of the belt and to return it to its predetermined path. A light leaf spring 97 having one end secured to the arm 87 and its other end maintained under slight tension against the frame 42 provides a slight force upon the ring 80 in a direction toward the sensed edge of the belt in order to overcome the frictional forces in the sensing mechanisms and to insure that the ring will follow the edge if it deviates away from the ring.

The sensing arrangement and belt deviation control described above allows correction of belt deviation in either direction by positively actuating countermeasures in either direction, and to accomplish this control from only one edge of the belt. There is no need to utilize a constant spring force or the equivalent which normally causes the movement of the belt in one direction by force the rocking a yoke member in one rotation and to positively drive the belt in the opposite direction so as to maintain the desired positioning of the belt. There is also no need for using two belt sensing mechanisms, one for each belt edge. The above described sensing and control arrangement provides a double-acting single sensing control.

In addition, the sensing of belt deviation is accomplished at one roller and the actual tracking is produced at another roller, the next roller positioned downstream of belt movement. In this manner, the time lag for correction of belt deviation is almost nil with only a portion of the belt experiencing a deviation. There is not need for a full circumferential movement of the belt before correction is imposed, as is the case wherein sensing and correction occurs at the same roller.

Figure 5:
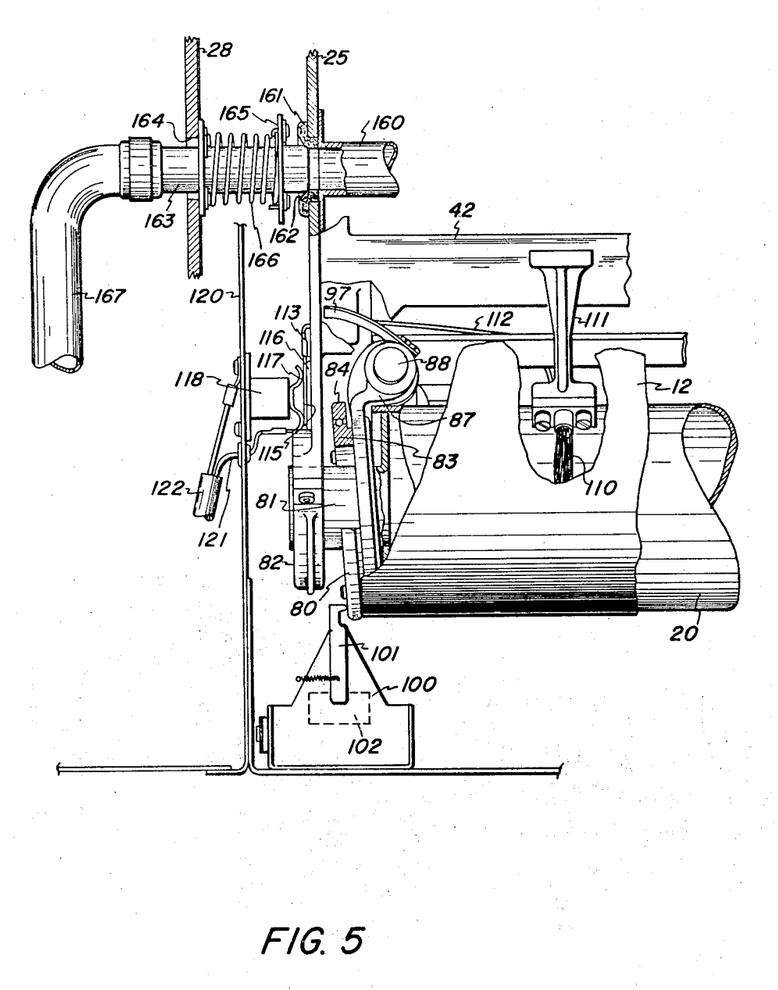
FIG. 5 is a sectional view of a detail of the belt tracking system.

As previously stated, wearing of the relatively delicate sensed edge of the photoreceptor belt is held to a minimum by the use of a sensing ring that is mounted for rotation along with and while in contact with the edge. In FIG. 5, the ring 80 is shown to have inner and outer diameters which provide a relatively large and long surface area for the edge to engage and to do so without slipping off the ring or to miss it entirely. Wearing of the sensed edge is also held to a minimum by virtue of the arrangement wherein edge sensing occurs at a roller which has its axis fixed, such as the roller 20, and whereat the belt is relatively stiff in a transverse direction so that it will not be able to buckle or curl when it engages a sensing element. Sensing between rollers where the belt may be unsupported in a transverse line with a sensing element in the path of lateral movement of the sensed edge as deviates may result in a curling or buckling of the belt as it contacts the element and before it has sufficient stiffness force to produce movement of the sensing element. This will result in a sensing activity that lacks sensitivity, predictability and accuracy. In order to take advantage of the relative transverse stiffness of the photoreceptor belt on the roller 20, the sensing element takes the form of the flat ring 80 which encirles the shaft for the roller at which sensing occurs and which has a mean diameter approximately equal to the diameter of the arc of the belt as it travels around the roller. It will also be noted that the plane of the sensing surface of the ring 80 is slightly canted thereby assuring that contact with the sensed edge of the belt always occurs at the same place relative to the adjacent end of the roller 20 and the ring 80. With the ring 80 being mounted on the inner race of a ball bearing assembly, the ring will rotate and along with the edge of the belt when the same contacts the ring.

In order to prevent extreme lateral deviation of the belt during machine use, there is provided a protection shut-off circuit (not shown) which is connected to the main power source to the machine for shutting it down with the occurrence of this sort of deviation and a switch mechanism 100 actuable in response to extreme belt deviation. The switch mechanism includes a switch arm 101 in engagement with the support plate 85 for the sensing ring 80 and which serves to actuate a suitable double acting switch 102 in the mechanism 100. This mechanism along with the arm 101 is set to actuate the switch 102 to open the machine power circuit in the event the arm 101 is deflected in either direction beyond predetermined set limits, in response to movement of the sensing ring 80 in either direction beyond prescribed limits. Such extreme deviation may be caused by belt failure or sudden obstructions to its path of movement such as by a sheet of paper being carried around with the belt, or failure in the structure of the belt assembly.

Mounted within the belt assembly module 14 is an electrode device for providing an electrical connection of the photoconductive belt 12 and wiring associated wih the machine electrical power and control circuits. Each of the belt supporting rollers 20, 21 and 22 are coated with a thin electrical insulating material such as rubber so as to prevent electrical leakage or dissipation of voltage levels on the electrostatic latent images on the belt. The electrode device includes a brush 110 having metallic bristles preferably made of stainless steel and brushing contact relative to the conductive substrate of the belt 12. The brush 110 is insulatingly secured by a bracket 111 to the frame structure 42 and is electrically connected by a wire 112 to an insulated binding post 113 secured to the outside surface of the side support plate 25 of the belt module. The side plate 25 is formed with an opening 114 for allowing the exterior protrusion of the wire 112 and its mounting exterior of the belt module.

The binding post 113 is electrically connected to an elongated conductive bar 115 secured on insulating material 116 which, in turn, is secured to the side support 26. Cooperating with the bar 115 in an electrical relationship is a flexure electrode element 117 secured by means of an electrical insulating block 118 to a support plate 120 mounted on the machine from structure 28. The flexure element 17 is connected by a conductor 121 to the electrical lead 122 which forms part of the machine control circuits and logic. Since machine circuits and logic assume such diverse forms and complexity, they are not illustrated in the drawings. The purpose of the metallic brush 110, wire 112, bar 115, flexure element 117, wire 121 and lead 122 is to electrically connect the conductive substrate which forms an integral part of the photoconductor belt 12, to the control circuits for the machine. Since the purpose for the electrical path is known in the electrostatic printing art, further description and illustration, except for the specific arrangement of the electrical elements described above, is not necessary for one skilled in the art.

This electrical connection to the conductive substrate for the belt 12 permits the removal of the entire belt assembly 14 from the support frame 28 without the need to disconnect wires or the utilization of mechanically actuated switches. When the belt assembly is moved from its operative position, the electrical circuit from the machine circuits to the belt assembly is interrupted since movement of the belt assembly carries the bar 115 therewith and out of contact with the flexure electrode 117. Return of the belt assembly to its operative position forces the bar 116 against the flexure electrode to flex the same and insure contact therewith. During movement of the belt assembly into operative position, the same will be moved somewhat laterally and upwardly because of the sliding action of the assembly support hollow shafts 23, 43 upon their respective support shafts 32, 46 and as the hollow shafts are centrally adjusted by the action of the chamfered ends 34, 44 upon the tapered portions 31, 45 respectively. The bar 115 and the element 117 are of a size to permit the limited lateral movements of the belt assembly and still insure electrical without damage or wear of these electrical parts.

In addition to electrical power being supplied to the dismountable belt assembly, there is also supplied, so to speak, air under reduced pressure, or a vacuum. Similarly, as will be described in detail below, the vacuum provision is accomplished by means of an arrangement which will allow easy mounting and dismounting of the belt assembly without need for pre-mounting or post-mounting manipulations.

As shown in FIG. 2, the belt assembly is in a form which provides three belt runs; that is, sections of the belt that lie in flat planes. In order to provide runs which are truly flat and which insure the positioning of a belt run in a precisely located plane, free of vibration, inadvertent deflection and which will assume the working position at all times, the belt assembly is provided with a flat holddown device for each of the runs. To this end, the exposure belt run, that is, the run between the rollers 20, 21 has associated therewith a holddown device 125, the development run between the rollers 21, 22 has the holddown device 126 and the cleaning run between the rollers 20, 22 has the holddown device 127. Since each of the devices are the same, except for size, only one, the development holddown device 126 will be described below.

Figure 6:
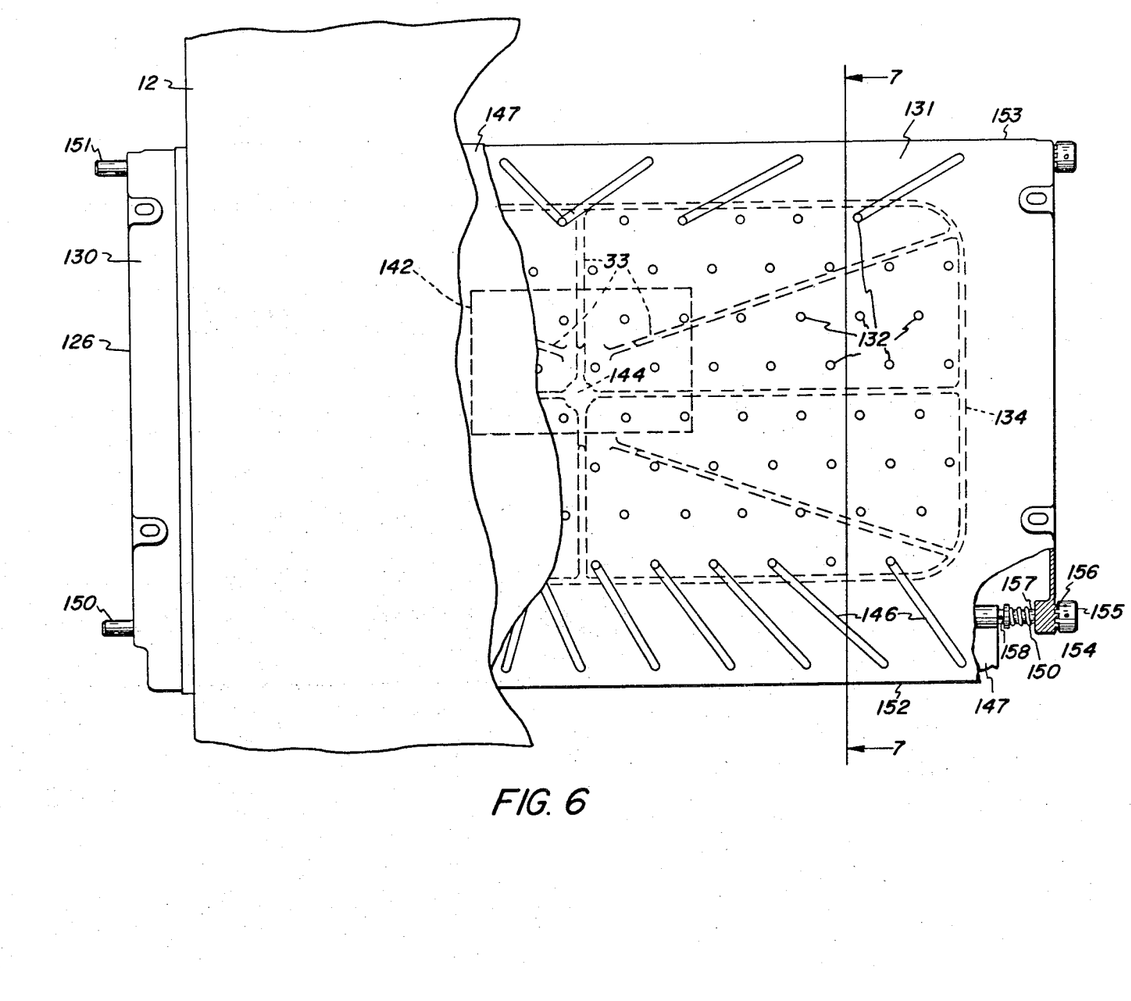
FIG. 6 is a plan view, partly broken away of a vacuum holddown device.

As shown in FIG. 6, the vacuum holddown device 126 comprises a vacuum plenum 130 having a flat surface plate 131 formed therethrough with many openings 132 upon which the photoconductive belt 12 is stretched across during movement thereof. On the other side of the plate away from the belt 12, the plenum includes a plurality of ribs 133 made integral with plate and projecting from the surface thereof. Along with the ribs, there is also integrally formed on the same side of the plate 131, a circumferential guard wall 134 which is connected to the exterior ends of all the ribs 133 and also which surrounds all of the openings 132.

The spaces between the ribs 133 and the circumferential wall 134 are closed off on that side of the plate 131 by a manifold 135 made of flexible plastic material and having a relatively flat web portion 136 positioned to span across all of the ribs and the wall 134. The outer circumferential edge of the manifold 135 is formed with a wall 137 which extends toward the plate 131 and completely surrounds the wall 134. The wall 137 terminates in a flange 138 which is secured to the adjacent surface of the plate 131 by suitable lock washers 140. In order to insure a vacuum seal within the interior chamber defined by the flat portion 136 of the manifold 135 and the plate 131, a circumferential gasket 141 or sealing device is positioned between the flange 138 and the plate. The manifold 135 also includes a chamber 142 formed with material from the web portion 136 and which terminates in a hose connector 143 to which a hose of air evacuation system may be secured. The chamber walls 142 extend beyond the plane of the web portion 136 approximately centrally of the plate 131 in order to provide access to all of the spaces between the ribs 133. As shown in FIG. 6, the chamber is in communication with all of the spaces between all of the ribs 133 some of which terminate short of the central core section 144 of the vertical and horozintal ribs as viewed in this figure.

In order to extend the vacuum effectiveness of the holddown device 126, the plate 131 on the side supporting the belt 12 is formed with grooves 146 of semi-circular cross-section connected to some of the outermost series of openings 132 and terminating adjacent the outer opposed edges of the plate 131. Since air is evacuated out of the space defined by the circumferential wall 134 within which the outermost series of openings 132 are confined, the effect of the vauum produced by this evacuation of air will be felt at the extreme outer limits of the grooves 146 and along the same. With the belt applied to the outer surface of the plenum plate 131, as shown in FIG. 6, and with the plenum subjected to a vacuum producing system, the belt will be forced against the plate by the resultant pressure differential effected between the spaces on either side of the plate 131. The effect of this force on the belt will extend between the outer ends of the series of grooves 146 on one edge of the plate 131 to the outer ends of the series of grooves at the other edge of this plate.

This force on the belt will be continuous as the same moves on the belt assembly 14 and will produce flattened, unwavering portion of the belt for whatever processing is to occur opposite the holddown device. For the above described holddown device 126, which is the one opposite the developer apparatus 15 and in the development zone B, the belt, during movement thereof, will be maintained in a fixed portion relative to the spacing between itself and the magnetic brushes utilized in the apparatus. As to the vacuum holddown device 125, located in the exposure zone A, the belt, during movement, will be fixed relative to the conjugate of the optical axis for the printing machine. Similarly, the holddown device 127, positioned in the cleaning - charging zone, will fix the belt as the same moves for these functions.

The vacuum holddown device 126 also is provided with a flexible web material 147 stretched across the plenum plate 131 for various purposes. The web material 147 is electrically insulating since the surface of the belt 12 which slides across the material and which is under considerable force thereon, comprises the conductive layer of the photoconductive belt. The material 147 then electrically insulates the belt 12 relative to the holddown device. In addition, the material, preferably made of soft fabric or paper, protects the conductive layer of the belt against abrasions and wear, as well as to reduce the friction between the moving belt and the plate 131 and to prevent the plugging or restricting of the openings 132 by dirt, etc.

Figure 7:
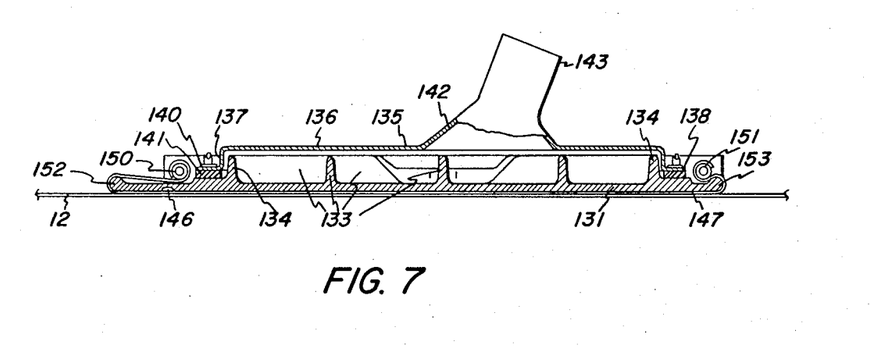
FIG. 7 is a sectional view taken along lines 7—7 in FIG. 6 showing the holddown device in an inoperative condition.

The web 147 is maintained on the outer surface of the plenum plate 131 by means of a pair of parallel arranged rods 150, 151 secured to each end of the material and held in fixed positions under the outer edges of the plenum plate. As shown in FIG. 7, the web 142 turns around both outer edges 152, 153 of the plate 131 with one end of the material wrapped around the rod 151 for a few turns and the other end of the material wrapped around the rod 152 for a few turns.

The rod 150 adjacent the plate edge 152 and below the same is journaled for rotation in a pair of aligned bosses 154 (one of which is shown in FIG. 6) located at opposite ends of the plenum 131. Since both of the rods 150, 151 and their associated structure are identical, only the rod 150 and attentent structure will be described in detail. The rod 150 extends through and is slidably retained by the boss 154 and has one of its outer ends secured to a knob 155 which is formed on one side with serrations 156. These serations are engageable with corresponding serrations formed in the outer surface of the boss 154 and when engaged therewith, prevents the knob and the rod 150 from rotation. The knob is forced against the boss so that the cooperating serrations are interlocked by means of a coil spring 157 which encircles the rod 150 and held in light compression between the inside surface of the boss and a pin 158 secured to the rod. With this arrangement, in order to place the web material 147 under tension, which is desirable, an operator need only to pull the knob 155 against the bias of the spring 157 so as to disengage the coating serrations, and to turn the knob in a direction which will wind the material around the rod 150. Similarly, the rod 151 is also provided with a web tightening arrangement associated with the rod 151. To remove the web material, the rod 150 need only be rotated to unravel the material carried thereby. Suitable material gripping devices may be provided on each of the rods 150, 151 for securing ends of the material and permit winding upon each of the rods.

Figure 8:
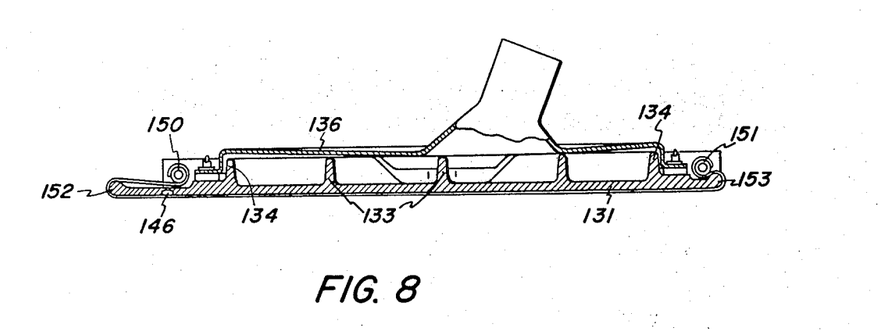
FIG. 8 is a view similar to that in FIG. 7 but showing another condition of operation.

During machine shutdown when a vacuum producing means, which is generally in the form of a blower and duct work, in the printing machine is inoperative, the web 136 for the manifold 135 is in its flattened, unstressed condition as shown in FIG. 7. When the vacuum producing means is rendered operative, air is drawn from the external circuitry of the plenum 131, through the material 147 and openings 132, through the space spaces the ribs 133 and within the wall 134 and out of the chamber 142. With the belt 12 being applied against the plenum 131, a vacuum is produced in these spaces to cause the belt to be drawn under force upon the plate 131 and also to raise the web 136 to flex and be drawn against the adjacent edges of the ribs 133, as shown in FIG. 8. Normally, when not so fixed, the web 136 is spaced slightly from these edges of the ribs thereby maintaining the manifold 135 and the plenum 131 in unstressed condition. However, under vacuum conditions, which would cause the tendency for the plenum plate to flex, an undesirable result, the flexing of the web 136 and the forces produced by the vacuum conditions thereon and what these resultant forces will produce, in turn, upon the ribs 133, eliminates actual flexing of the plate 131. For this purpose, the material of the manifold 135 is such as to permit the flexing of the web portion 136 with less force than the force necessary to cause flexing of the plate 131 thereby insuring the flexing of web to accomplish its function before any opportunity for the plate 131 to flex. When the web 136 contacts the ribs 133, the atmospheric pressure on both sides of the holddown device equalize and there is no platen deflection. The only load then on the platen is the weight of the platen itself plus the loads of the extraneous processing devices in contact with the belt 12 at this point.

As previously stated, the vacuum holddown devices 125, 126 and 127 are structurally and functionally similar. Each is provided with a chamber 142 and a hose connector 143, as shown in FIG. 2. All of these hose connectors are jointed together to a common pipe 160 (see FIG. 5) which is directed to the one side of the belt assembly. The pipe 160 extends through the side plate 25 and terminates thereat into an enlarged flange 161 secured to the outside surface of the plate. The flange 161 is formed with an outwardly tapering wall 162 in the opening therein which is lined with insulating material. The tapering wall for this opening has a diameter slightly larger than the inner diameter of the pipe 160 and is adapted to engage the end of a cooperating pipe 163 extending through an opening 164 formed in the frame structure 28. The outer diameter of the pipe 163 is slightly larger than the inner diameter of the pipe 160 in order to prevent insertion therein and to permit the contacting of the end of the pipe 163 with the tapering wall 162 so as to become air sealed relative thereto.

A flat collar 165 encircles the pipe 163 and has one end of a coil spring 166 secured thereto. The spring encircles the pipe 163 and it is secured to the adjacent surface of the frame 28 so as to surround the opening 164. The portion of the pipe 163 which projects on the other side of the frame 28 is connected to a suitable air hose 167 which in turn is connected to the vacuum producing system for the printing machine. It will be apparent that the pipe 163 may be forced deeper into the frame 28, or in a direction to the left as viewed in FIG. 5, against the bias of the spring 166. In this action and the retraction action when the force is released, the end of the pipe 163 may undergo limited lateral movement in any direction because of the spring connection to the frame 28. When the belt assembly 14 is moved away from the fixed frame 28 during dismounting of the same, the pipe 163 will become disengaged from the tapered surface of the pipe 160 thus breaking the air tight connection between these parts. When the belt assembly is to be mounted, movement of the wall 25 toward the frame 28 will cause the eventual connection of the pipe 163 to the pipe 160 without the need for accurate prealignment, at least to the extent the end of the pipe 163 can be brought into contact with the tapered wall 162. This contact will eventually cause movement of the end of the pipe 163 to a centered alignment position relative to the pipe 160.

For the foregoing description of the belt assembly vacuum connection arrangement with its machine source and of the electrical connection of this assembly to the machine power and control circuit, it will be appreciated that these arrangements provide a means which will allow the coupling and uncoupling of a vacuum producing system and an electrical source to a belt assembly module capable of being moved out of communication with the respective sources. It will be also appreciated that these actions can be accomplished without manipulation by an operator, that the belt assembly module may be moved into and out of source connection at something other than precise alignment, and that the connecting co-acting parts are such as not to become readily broken due to skewing or misalignment during module movement.

While the invention has been described with reference to the structure disclosed, it is not confined to the details set forth; but is intended to cover such modifications, or changes as may come within the scope of the following claims.

What is claimed is:

1. A vacuum holddown device for use with flexible web material for holding the same in flattened condition during movement of the material relative to the device comprising a plenum plate formed with a plurality of openings for permitting the flow of air therethrough and having a side surface across which the material is moved, a plurality of extending portions extending substantially perpendicularly from the other side of said plate, one of said portions completely surrounding the other extended portions, a manifold mounted to the said other side of said plate and including a section positioned in spaced relation relative to the extended portions of the plenum plate, said manifold also including an edge member adapted to surround said one extended portion and for attachment to said other side of the plate for defining an enclosed space between said manifold and the plate, said manifold being made of material adapted to flex when the air pressure on one side thereof is reduced to a normal operating level, such flex being sufficient to cause said manifold to move toward said plenum plate and contact said extending portions, and means for connecting the space to a vacuum producing means for reducing the air pressure within said space below the predetermined level thereby drawing the web material to said side surface.

2. The holddown device of claim 1 wherein said plenum plate is formed with a plurality of air-conducting passageways in communication with the space between the plate and said manifold and projecting beyond said one extending portion to said side surface.

3. The holddown device of claim 1 including means for applying a flexible material having air-flow-through capabilities across said side surface between the web material and the plenum plate.

* * * * *